Feb. 28, 1950  J. D. CALFEE ET AL  2,499,129
PHOTOCHEMICAL MANUFACTURE OF
1,1,1-DIFLUOROCHLOROETHANE
Filed March 17, 1948
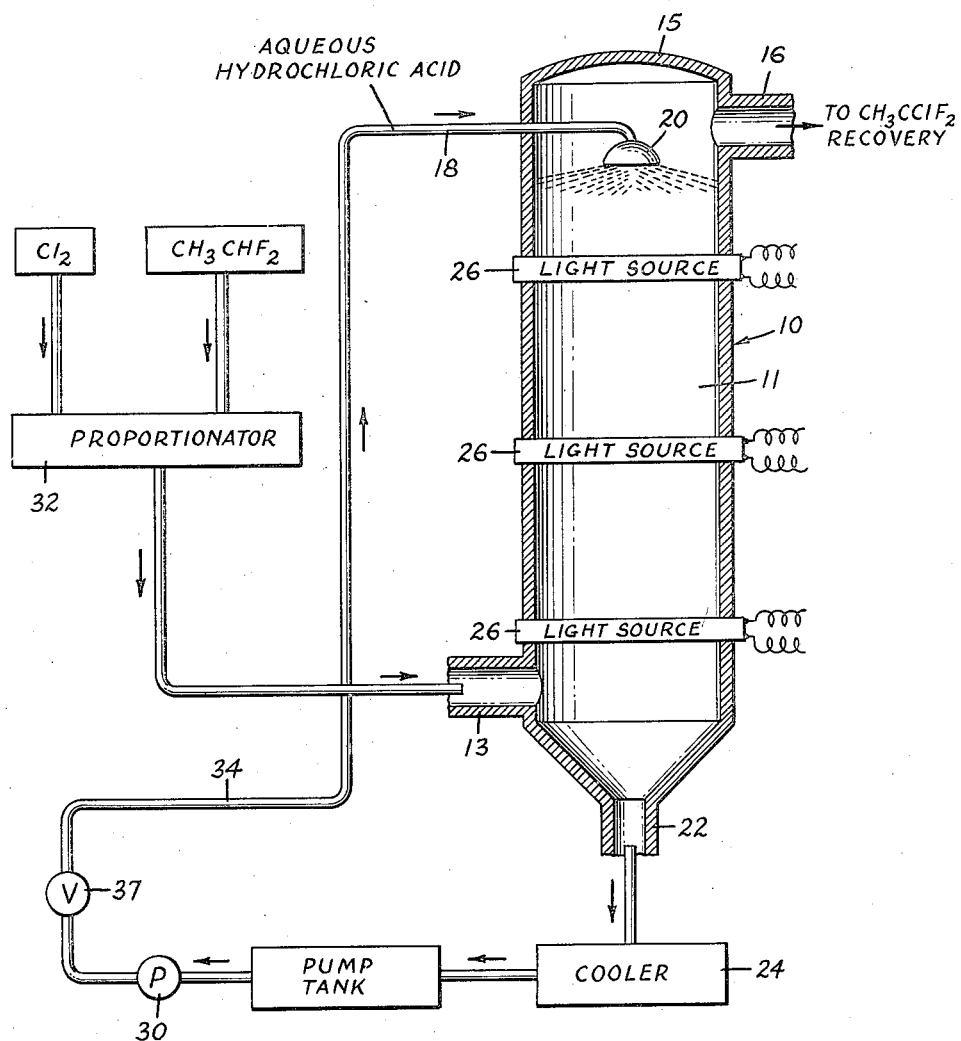
INVENTOR.
JOHN D. CALFEE
BY   PATRICK A. FLORIO
ATTORNEY.

Patented Feb. 28, 1950

2,499,129

UNITED STATES PATENT OFFICE 2,499,129

PHOTOCHEMICAL MANUFACTURE OF 1,1,1-DIFLUOROCHLOROETHANE

John D. Calfee, Manhasset, and Patrick A. Florio, Woodside, N. Y., assignors to Allied Chemical & Dye Corporation, New York, N. Y., a corporation of New York Application March 17, 1948, Serial No. 15,344

8 Claims. (Cl. 204—163)

This invention relates to chlorination of fluorinated hydrocarbons and more particularly is directed to improvements in the actinic chlorination of ethylidene fluoride ($CH_3CHF_2$) to 1,1,1-difluorochloroethane.

A mixture of ethylidene fluoride and chlorine may be subjected to the action of actinic radiation to produce the monochlorinated derivative 1,1,1-difluorochloroethane. During the actinic chlorination procedure, considerable heat of reaction is generated and, in the absence of extraneous cooling, temperature in the reaction zone may rise to as high as 300° C. and above. While in small scale equipment, relatively high temperatures are not so detrimental, experience shows that in commercial size operations high reaction zone temperatures result in low reactor capacity and relatively low yields of 1,1,1-difluorochloroethane caused principally by decrease in the amount of ethylidene fluoride entering into reaction, and by conversion of considerable ethylidene fluoride to undesirable polychlorinated material. In an effort to obtain adequate cooling of the reaction to avoid the above difficulties, introduction of cooling water into the reaction zone as well as external circulation of cooling water on the outer wall of the reactor have been attempted. In the case of external water cooling, although some cooling of the reaction is effected, at commercially practical rates of raw material throughput, the amount of cooling is negligible. On the other hand, internal water cooling of the reaction zone is highly unsatisfactory because so much heat is liberated by absorption in the cooling water of HCl gas formed in the chlorination reaction that excessively large quantities of water are needed for cooling requirements, thus entailing high coolant circulation costs. Further, such procedure results in loss of HCl as a weak hydrochloric acid liquor.

As principal objects, this invention aims to provide reaction zone temperature conditions and reaction zone cooling processes, for use in the actinic chlorination of ethylidene fluoride to the monochlorinated derivative 1,1,1-difluorochloroethane, the practice of which temperature conditions and cooling processes facilitates commerical scale operation and makes it possible to increase reactor capacity, and increase 1,1,1-difluorochloroethane product yield by decreasing the amount of ethylidene fluoride passing thru the reactor in unreacted condition and by minimizing formation of by-products including polychlorinated material.

In the development of commercial scale procedures, and in accordance with one aspect of the present improvements, we have discovered that in order to obtain good commercial yields of monochlorinated ethylidene fluoride and high reactor capacity, the maximum temperature of the gases in the reaction zone should not exceed 150° C., a preferable operating temperature range being about 80°–120° C., most desirably about 95°–105° C. In accordance with another major feature of the invention, it has been found that such operating temperatures may be practically and conveniently attained by passing liquid hydrochloric acid of certain HCl strength thru the gaseous atmosphere of the reaction zone. Thus, we have discovered that the actinic monochlorination of ethylidene fluoride to 1,1,1-difluorochloroethane may be carried out smoothly, at high capacity and with good yields by maintenance of the reaction zone temperatures stated, particularly by use, as an internal reaction zone cooling medium, of aqueous liquid hydrochloric acid of certain HCl concentrations. In the broader aspects, the process of the invention comprises subjecting, in a reaction zone, a mixture of ethylidene fluoride and chlorine to the action of actinic radiation to form 1,1,1-difluorochloroethane and gaseous HCl, passing thru said zone aqueous liquid hydrochloric acid having an HCl concentration not less than 20%, preferably of HCl concentration corresponding substantially with the absorbable HCl content of the liquid acid at the temperature of operation, and regulating the temperature of the liquid acid entering and the quantity of acid passed thru the zone so as to maintain therein a maximum gas temperature less than 150° C. and so as to effect discharge of some aqueous liquid hydrochloric acid from the reaction zone. The invention further comprises utilization of certain ethylidene fluoride-chlorine ratios; dispersion of the liquid cooling acid in the gaseous atmosphere of the reaction zone, preferably dispersing the cooling acid in the reaction zone so as to maintain a film of the liquid acid covering the entire inner walls of the reaction zone; and regulating the temperature of the liquid acid as introduced into the reaction zone, and the quantity of liquid acid passed thru the reaction zone so as to maintain in the reaction zone gas temperatures at or below the indicated maximum, and, in the preferred embodiment, so as to maintain substantially all of the liquid acid cooling medium passed thru the reaction zone in the liquid phase. After passage thru the reaction zone, the liquid acid is withdrawn, cooled, and recirculated thru the reaction zone.

In practice of the invention, chlorine and ethylidene fluoride preferably in certain proportions are passed into the reaction zone, and the mixture is subjected to the action of actinic radiation to affect reaction in accordance with the following equation:

$$CH_3CHF_2 + Cl_2 \rightarrow CH_3CClF_2 + HCl$$

The reaction is a substitution chlorination involving the exchange of one hydrogen on the carbon containing the two fluorine atoms for one chlorine atom to yield the monochlorinated derivative.

In order to obtain good yields of $CH_3CClF_2$, among other process control factors, it has been found that ethylidene fluoride and chlorine should be employed in ratios of one molar proportion of ethylidene fluoride to not more than two mols of chlorine, a good working ratio being one mol of ethylidene fluoride to not less than 0.5 and not more than 1.5 mols of chlorine, with best results being obtained when employing a ratio of about one to one.

The mixture of ethylidene fluoride and chlorine in the reaction zone is subjected to the action of actinic radiation produced by any form of light which effects chemical reaction, such as diffused daylight, infra-red rays, ultra-violet, and ordinary incandescent lamps, although fluorescent light is preferred. The reaction is exothermic and temperatures as high as 300° C. or more may be generated in the reaction zone if no cooling means is employed.

While the process of the invention may be carried out in any suitable type of apparatus, the accompanying drawing illustrates partly in section and partly diagrammatically one form of reactor and accessory apparatus which may be employed in carrying out the invention. In the drawing, 10 represents a reactor providing an elongated cylindrical reaction zone 11. The reactor walls may be made of any suitable opaque material such as molded carbon. At the lower end is a gas inlet pipe 13 and connected to the opposite side near top 15 is an outlet pipe 16 for conveying the gaseous reaction products out of the reactor and into a $CH_3CClF_2$ recovery system not shown. At the upper end of the reactor is a hydrochloric acid inlet pipe 18 which connects to a spray nozzle 20 located in the central upper portion of the reaction zone which terminates at the lower end with a hydrochloric acid outlet pipe 22 discharging into a cooler 24. The reaction zone may be provided at any suitable point with a thermowell to accommodate a thermocouple for measuring the temperature in the reaction zone.

The interior of the reactor may be provided with a bank of parallel fluorescent lamps 26. The number and arrangement of the fluorescent lamps may be chosen so as to provide sufficient actinic radiation throughout all portions of the reaction chamber to effect rapid and smooth chlorination. Alternatively, the reactor walls may be made of glass, and light supplied by suitably externally arranged light bulbs.

In accordance with the invention, it has been found that, in the manufacture of 1,1,1-difluorochloroethane by the actinic chlorination of ethylidene fluoride, liquid hydrochloric acid is a markedly efficient internal reaction zone coolant because by the practice of certain control conditions, which we have determined relative to the passage of the liquid hydrochloric acid thru the reaction zone, it is possible to provide temperature regulation in the reaction zone, and at the same time afford liquid hydrochloric acid of such HCl concentration so that during passage thru the reaction zone the liquid hydrochloric acid does not absorb any appreciable amount of the HCl gas formed in the reaction zone and, in the preferred embodiment, so that there is boiled off from the liquid hydrochloric acid no substantial amount of an $HCl-H_2O$ vapor mixture into the gaseous reaction atmosphere. The improvements constituting the invention are predicated largely on the discovery that, for a given set of operating conditions involving passage of aqueous liquid hydrochloric acid thru the reaction zone, cooling the liquid acid discharged from the reaction zone, and recirculating the cooled acid thru the reaction zone, the liquid hydrochloric acid automatically attains an HCl concentration such that the liquid cooling agent does not absorb any appreciable amount of HCl gas formed by the reaction. Aside from flexible reaction zone gas temperature control, these discoveries afford the advantage that since the cooling agent absorbs no substantial quantity of HCl gas from the chlorination reaction, no substantial amount of heat is generated in the reaction zone and the temperature of the coolant does not rise as a result of generation of heat of solution of HCl gas in the cooling medium. This feature makes it possible to carry out the cooling by use of a minimum volume of cooling agent. Further, since under the preferred conditions of operation no great amounts of an $HCl-H_2O$ water mixture are boiled off into the gaseous reaction atmosphere, the exit gas of the reaction zone, containing principally the 1,1,1-difluorochloroethane product and the HCl by-product, is not unduly overloaded with HCl and water vapor. Also, the use of liquid hydrochloric acid as a coolant avoids introduction of contaminants into the reaction zone.

When practice of the invention process is under way and proceeding under any given set of operating conditions, liquid hydrochloric acid is passed to the reaction zone, discharged therefrom, cooled in cooler 24, recirculated thru the reaction zone by pump 30, and such acid has an HCl concentration which is at least that corresponding with the HCl concentration of the constant boiling aqueous hydrochloric acid solution, i. e. at least about 20% HCl. The process may be started up by filling the circulating system with e. g. water or weak hydrochloric acid of less than 20% strength, hydrochloric acid of strength of about 25-30% HCl (the HCl concentration most usually predominating in normal operation) or with high e. g. 35-37% hydrochloric acid.

If the process is started up by using initially water or weak hydrochloric acid of less than 20% strength, by a few preliminary recirculations of the liquor thru the reaction zone, the HCl concentration of the liquid acid increases thru absorption of HCl gas formed in the reaction zone until the HCl concentration of the liquid acid reaches the maximum absorbable amount of HCl under the particular temperature of operation. For example, assume that extraneous cooling of acid liquor, and quantity of cooling acid passed thru the reaction zone are chosen so as to maintain in the reaction zone a maximum internal gas temperature of about 100° C. In this circumstance, HCl concentration of the liquid will increase to roughly 25% and, at this temperature of operation, the liquor will no longer absorb any material amount of HCl out of the reaction atmosphere. Similarly, if the process is started up using say 35–37% hydrochloric acid, during a few preliminary recirculations thru the reaction zone, HCl boils out into the reaction zone atmosphere until, under the temperature conditions instanced, the HCl concentration of the liquor decreases to about 25%, and thereafter the liquor neither desorbs or absorbs HCl out of the reaction atmosphere.

In accordance with the invention, it has been found that the feature of substantial non-absorption by the cooling medium of HCl gas formed in the reaction may be attained by recirculating thru the reaction zone aqueous liquid hydrochloric acid having an HCl concentration not less than 20%, and regulating the temperature of the acid entering and the quantity of acid passed thru the zone so as to maintain therein the desired maximum gas temperature and so as to effect discharge from the reaction zone of at least an appreciable quantity of aqueous liquid hydrochloric acid. By thus proceeding, absorption of substantially no HCl gas out of the reaction zone may be had regardless of whether the temperature and quantity of acid passed into and thru the reaction zone are such as to maintain reaction zone gas temperatures in the lower or in the higher portion of the stated 80–150° C. range.

If temperature and quantity of acid fed into the reaction zone are such as to maintain gas temperatures therein at say about 100° C., the liquid acid will be discharged from the reaction zone, as a practical matter, at a temperature considerably less than 100° C. Since such liquid acid temperature is significantly below about 108° C., the approximate boiling point of the constant boiling HCl-H₂O solution, no great amount of an HCl-H₂O mixture is boiled out of the liquid acid during passage thru the reaction zone, and the quantity of liquid acid discharged from the reaction zone is approximately the same as the quantity of the acid fed into the zone, the appreciable difference between the inlet acid and the outlet acid being one of temperature only. In this circumstance the hydrochloric acid liquid passes thru the reaction zone without appreciable change with respect to either HCl concentration or volume, and the result is no substantial absorption of HCl gas out of the reaction zone nor any substantial boiling off of an HCl-H₂O vapor mixture into the reaction zone. Hence, when working so as to maintain reaction zone maximum gas temperatures of about 100° C. or less, temperature of the liquid in the reaction zone is held appreciably below 108° C., and absorption of substantially no HCl gas out of the reaction zone, boiling off into the reaction zone of substantially no HCl-H₂O vapor mixture, and discharge from the reaction zone of a volume of cooling acid substantially equal to the volume of acid introduced into the reaction zone are automatically effected.

If it is desired to maintain reaction zone gas temperatures in the higher portion of the 80–150° C. temperature range, e. g. at 140° C., conditions differing from the foregoing may exist in the reaction zone. The 140° C. temperature is substantially higher than the 108° C. boiling point of the constant boiling HCl acid-water solution. If liquor temperatures in the reaction zone, as distinguished from gas temperatures, were to rise to about 108° C., an HCl-H₂O mixture of constant boiling composition would boil off into the reaction atmosphere, the volume of liquid would be decreased during passage thru the reaction zone, and the gaseous exit of the reaction zone would contain whatever amount of HCl-H₂O mixture had been boiled out of the liquid acid. But even if reaction zone gas temperatures are high enough to bring liquor temperatures up to 108° C., it will be seen that there is no absorption of HCl gas out of the reaction zone and one objective of the process, i. e. non-absorption of HCl gas out of the reaction zone is accomplished.

However, as above indicated, it is preferred to carry out the reaction cooling operation so that, in addition to non-absorption of HCl gas, no substantial amount of HCl-H₂O vapor mixture is boiled out of the cooling liquid and into the reaction atmosphere. We find that even if it is desired to operate the reaction zone at a high maximum gas temperature, e. g. 140° C., it is still possible to prevent boiling off into the reaction zone atmosphere of any great amount of HCl-H₂O vapor mixture. This result may be obtained by regulating the temperature of the acid entering and the quantity of acid passed thru the zone so as to maintain therein the desired maximum gas temperature, e. g. 140° C., and so as to maintain substantially all of the aqueous liquid hydrochloric acid passed thru the reaction zone in the liquid phase, i. e. so that the volume of liquid discharged from the reaction zone is approximately the same as the volume of liquid introduced into the reaction zone. As a practical matter, in all embodiments of the invention, in order to prevent boiling off into the reaction zone of any substantial amounts of an HCl-H₂O vapor mixture, the temperature of the acid entering and the quantity of acid passed thru the zone are regulated so as to effect discharge from the reaction zone of liquor at a temperature appreciably less, e. g. 20–65° C. less, than the 108° C. boiling point of the constant boiling hydrochloric acid-water solution. Preferably, the control indicated is such that the temperature of acid as discharged from the reaction zone is not more than about 75° C.

In practicing that embodiment of the invention in which the preferred gas temperature range of 95–105° C. is maintained in the reaction zone, that is by recirculating aqueous liquid hydrochloric acid thru the reaction zone and regulating the temperature of the acid entering and the quantity of acid passed thru the reaction zone so as to maintain therein a maximum gas temperature of 95–105° C., the temperature of the liquor discharged from the bottom of the reaction zone is necessarily at, and practically is generally several degrees below, the maximum temperatures in the reaction zone. Preferably, temperature of discharged acid is held at 40–75° C. For a given set of operating conditions, including maintenance in the reaction zone of maximum gas temperatures in the range of 95–105° C., the liquid acid circulated thru the reaction zone attains an HCl concentration of the order of 25–28%, absorbs substantially no HCl gas out of the reaction zone, and liquor is discharged from the bottom of the reaction zone at a temperature automatically low enough so that there is no substantial boiling off of HCl-H₂O vapor mixture into the reaction zone. Hence, when working so as to maintain in the reaction zone temperatures in the preferred range of 95–105° C., the only necessary expedient of control, relative to the passage of liquid cooling medium thru the reaction zone, is to regulate the temperature of the acid entering and the quantity of acid passed thru the zone so as to maintain therein the maximum gas temperature in the desired range of 95–105° C., and when this is done, the non-absorption and non-boiling off features automatically take care of themselves.

In carrying out the process of the invention in the reactor described, chlorine and ethylidene fluoride are mixed in proper proportion by any suitable metering device 32, and the mixture is fed into the reactor thru inlet pipe 13. Reaction of the chlorine and ethylidene fluoride is effected by light emitted from fluorescent lamps 26 and the gaseous products of reaction including the sought-for 1,1,1-difluorochloroethane, HCl and small amounts of by-products containing polychlorinated material leave the reactor thru outlet pipe 16. To cool the actinic chlorination reaction, liquid hydrochloric acid of at least 20% strength is continuously introduced thru inlet pipe 18 leading to spray nozzle 20. In accordance with the invention, nozzle 20 is designed and constructed so as to disperse into the gaseous reaction atmosphere cooling acid of particle size large enough to avoid sweeping out any substantial amounts of liquid acid with the gas stream, and preferably so as to form and maintain a downwardly flowing film covering substantially the entire inner walls of the reaction zone, this film feature having been found to be of substantial importance with respect to minimizing wall corrosion. On reaching the bottom of the reactor, the liquid acid is withdrawn thru pipe 22, externally cooled in cooler 24 by any suitable means, and then pumped back thru line 34 and inlet pipe 18 for recirculation thru the reactor. It will be understood the above described regulation of passage of liquid acid thru the reaction zone may be effected by suitable control of pump 30 and valve 37. Any make-up water needed in the circulating system from time to time may be introduced into cooler 24.

The various constituents of the exit gases from the reactor including the 1,1,1-difluorochloroethane product may be separated and recovered in any satisfactory manner in apparatus not shown. Thus, the effluent of the reactor may be passed first thru a water scrubber to remove most of the HCl from the gas stream, then thru a scrubber which may contain a suitable aqueous caustic soda solution, e. g. 10 to 20% NaOH, to remove the unreacted chlorine and the last traces of HCl from the gas stream. Thereafter the gas may be passed thru a suitable dryer such as a column of silica gel or calcium chloride to thus produce a gas stream which contains principally $CH_3CClF_2$ unreacted $CH_3CHF_2$, some $CH_2ClCHF_2$ and a small amount of polychlorinated starting material. All of the constituents of the gas may then be totally liquefied in a suitable receiver by cooling to well below −24.7° C., the boiling point of ethylidene fluoride, after which the receiver may be transferred to a still and the temperature thereof raised sufficiently to distill off the $CH_3CHF_2$ which may be recirculated to the reactor. The residual liquid in the still is a mixture of reacted materials containing predominantly 1,1,1-difluorochloroethane. The temperature of the liquid in the still may be raised sufficiently to distill off an overhead, which when condensed is a liquid having a boiling point of about −9.6° C. and is the 1,1,1-difluorochloroethane product, leaving in the still a residue containing $CH_2ClCHF_2$ and polychlorinated starting material which may be further separated if desired.

The following example further illustrates practice of the invention, all quantities being indicated in parts by weight.

A feed gas mixture consisting of 263 parts of ethylidene fluoride and 229 parts of chlorine was fed continuously into one end of a vertically disposed tubular Pyrex glass reactor, the reactor and the mixture being exposed to light generated by an adjacent fluorescent tube. Molecular proportions of chlorine to ethylidene fluoride actually passed thru the reactor throughout the run were 0.8 to 1, and rate of flow of the reactant gas mixture thru the reactor was about 150 space velocity per hour (volumes of reactant gas at room temperature per volume of reaction chamber per hour). Hydrochloric acid of about 27% strength and at a temperature of about 60° C. was introduced into the top of the reactor in such manner as to disperse some liquid acid in the gas space of the reaction zone, and so as to form a film of cooling acid flowing down over the entire inner wall of the reactor. Rate and quantity of liquid acid circulation thru the reactor were such that the maximum internal gas temperature in the reactor as measured by a thermocouple was 100° C. After passage thru the reaction zone, the hydrochloric acid at a temperature of 75° C. was withdrawn from the bottom of the reactor, passed thru water-cooled coils and then recirculated back into the reactor. The reactor gas mixture was continuously discharged from the reactor and bubbled thru water to remove most of the HCl, then bubbled thru a caustic soda solution of 20% NaOH to remove unreacted chlorine and the last traces of HCl and the gas stream was thereafter dried by passage thru a column of calcium chloride. The resulting gas mixture was then passed into a receiver packed in Dry Ice at minus 78° C. The liquid condensed in the Dry Ice receiver was fractionated at about minus 25° C. and the overhead vapor condensed to recover 61.5 parts of unreacted ethylidene fluoride, representing 22% of the original ethylidene fluoride starting material, and having a boiling point of about minus 24 to minus 25° C. Temperature of the residual liquid in the still was then raised to about minus 10 and 326.3 parts of overhead distillate having a boiling point of about minus 9 to minus 10° C. were recovered as 1,1,1-difluorochloroethane and representing a yield of 73%. 14 parts of still residue including predominantly polychlorinated material remained in the still representing about 5% of ethylidene fluoride starting material lost in this manner. Pertinent data and results of this example are tabulated as Run 3 of the appended table.

Runs 1 to 3 of the following table are illustrative of results obtained in actinic monochlorination of ethylidene fluoride to 1,1,1-difluorochloroethane when employing about 27% HCl as the recirculating cooling medium in accordance with the foregoing principles of the invention. Run 4 shows results obtained in carrying out the above reaction without internal cooling. All runs were carried out in the same reactor.

| Run No. | Molar Ratio Cl₂ to CH₃CHF₂ | Maximum Internal Gas Temp., °C. | S. V. H. | Yield in Percent of CH₃CClF₂ | Percent of Unreacted CH₃CHF₂ | Percent of CH₃CHF₂ Converted to High Boilers Including CH₂ClCHF₂ and Polychlorinated Material |
|---|---|---|---|---|---|---|
| 1 | 1:1 | 120 | 171 | 72 | 21 | 6.6 |
| 2 | 1:1 | 100 | 100 | 75 | 22 | 4.6 |
| 3 | 0.8:1 | 100 | 150 | 73 | 22 | 4.9 |
| 4 | 0.8:1 | 321 | 148 | 50 | 33 | 17 |

The term "S. V. H." represents space velocity per hour and the term "yield" is used herein to denote the percent by weight of ethylidene fluoride input which is recovered as 1,1,1-difluorochloroethane.

From the above data and results it is seen that by employing internal cooling of the reaction zone by means of hydrochloric acid of at least 20% strength in accordance with the invention, yields of CH₃CClF₂ in excess of 70% may readily be obtained when operating at comparatively high throughput rates of 150 to 170 S. V. H., while the amount of CH₃CHF₂ lost as by-product in the form of high boilers including polychlorinated material in considerably reduced, e. g. to values in the neighborhood of about 5%, when operating in accordance with the invention process. The important advantages of the invention are clearly seen from a comparison of results obtained when operating without internal cooling as shown in Run 4 with results realized in preceding Runs 1 to 3, utilizing the hydrochloric acid cooling principles of the invention. Run 3 is particularly comparative with Run 4 since both runs involve utilization of the same molar ratio of chlorine to ethylidene fluoride and about the same S. V. H. Thus, in Run 4 where maximum internal gas temperature was 321° C. as compared with the 100° C. temperature of Run 3, yield of 1,1,1-difluorochloroethane was only 50% as compared with the 73% yield of Run 3, while the percent of high boilers including polychlorinated material in Run 4 reached 17% as compared to the much smaller figure of about 5% in Run 3.

We claim:

1. The process for preparing 1,1,1-difluorochloroethane which comprises subjecting, in a reaction zone having a gaseous atmosphere, a mixture of ethylidene fluoride and chlorine to actinic radiation to form 1,1,1-difluorochloroethane and gaseous HCl, continuously recirculating through said zone aqueous liquid hydrochloric acid having an HCl concentration not less than 20%, dispersing said recirculated acid in said gaseous atmosphere, and regulating the temperature of said acid entering and the quantity of said acid passed through said zone so as to maintain therein a maximum gas temperature less than 150° C. but sufficiently high to cause formation of 1,1,1-difluorochloroethane and so as to maintain aqueous liquid hydrochloric acid discharged from said zone at a temperature not above the boiling point of the constant boiling HCl-H₂O solution and substantially below the maximum gas temperature in said zone and in the liquid phase.

2. The process for preparing 1,1,1-difluorochloroethane which comprises subjecting, in a reaction zone having a gaseous atmosphere, a mixture of ethylidene fluoride and chlorine to actinic radiation to form 1,1,1-difluorochloroethane and gaseous HCl, continuously recirculating through said zone aqueous liquid hydrochloric acid having an HCl concentration not less than 20%, dispersing said recirculated acid in said gaseous atmosphere, regulating the temperature of said acid entering and the quantity of said acid passed through said zone so as to maintain therein a maximum gas temperature in the range of 80-120° C. and so as to maintain aqueous liquid hydrochloric acid discharged from said zone at a temperature appreciably less than the boiling point of the constant boiling HCl-H₂O solution and substantially below the maximum gas temperature in said zone, and in the liquid phase, whereby for given operating conditions said acid absorbs substantially no HCl gas formed by said reaction and no great amount of HCl-H₂O vapor mixture is boiled out of said liquid acid into the gaseous atmosphere in said zone.

3. The process for preparing 1,1,1-difluorochloroethane which comprises subjecting, in a reaction zone having a gaseous atmosphere, a mixture of ethylidene fluoride and chlorine to actinic radiation to form 1,1,1-difluorochloroethane and gaseous HCl, passing through said zone aqueous liquid hydrochloric acid having an HCl concentration not less than 20%, dispersing said aqueous acid in said gaseous atmosphere, and regulating the temperature of said acid entering and the quantity of said acid passed through said zone so as to maintain therein a maximum gas temperature less than 150° C. but sufficiently high to cause formation of 1,1,1-difluorochloroethane and so as to maintain aqueous liquid hydrochloric acid discharged from said zone at a temperature not above the boiling point of the constant boiling HCl-H₂O solution and substantially below the maximum gas temperature in said zone and in the liquid phase.

4. The process for preparing 1,1,1-difluorochloroethane which comprises subjecting, in a reaction zone having a gaseous atmosphere, a mixture of ethylidene fluoride and chlorine to actinic radiation to form 1,1,1-difluorochloroethane and gaseous HCl, continuously recirculating through said zone aqueous liquid hydrochloric acid having an HCl concentration not less than 20%, dispersing said recirculated acid in said gaseous atmosphere, regulating the temperature of said acid entering and the quantity of said acid passed through said zone so as to maintain therein a maximum gas temperature less than 150° C. but sufficiently high to cause formation of 1,1,1-difluorochloroethane and so as to maintain aqueous liquid hydrochloric acid discharged from said zone at a temperature appreciably less than the boiling point of the constant boiling HCl-H₂O solution and substantially below the maximum gas temperature in said zone and in the liquid phase, whereby for given operating conditions said acid absorbs substantially no HCl gas formed by said reaction and no great amount of HCl-H₂O vapor mixture is boiled out of said liquid acid into the gaseous atmosphere in said zone.

5. The process for preparing 1,1,1-difluorochloroethane which comprises subjecting, in a reaction zone having a gaseous atmosphere, a mixture of ethylidene fluoride and chlorine to actinic radiation to form 1,1,1-difluorochloroethane and gaseous HCl, continuously recirculating through said zone aqueous liquid hydrochloric acid having an HCl concentration not less than 20%, dispersing said recirculated acid in said gaseous atmosphere so as to form a substantially unbroken film of liquid acid flowing over substantially the entire inner wall of said reaction zone, and regulating the temperature of said acid entering and the quantity of said acid passed through said zone so as to maintain therein a maximum gas temperature less than 150° C. but sufficiently high to cause formation of 1,1,1-difluorochloroethane and so as to maintain aqueous liquid hydrochloric acid discharged from said zone at a temperature not substantially higher than 75° C. and in the liquid phase.

6. The process for preparing 1,1,1-difluorochloroethane which comprises subjecting, in a reaction zone having a gaseous atmosphere, a mixture of ethylidene fluoride and chlorine in amount not more than two molecular proportions on the basis of the ethylidene fluoride to actinic radiation to form 1,1,1-difluorochloroethane and gaseous HCl, continuously recirculating through said zone aqueous liquid hydrochloric acid having an HCl concentration not less than 20%, dispersing said recirculated acid in said gaseous atmosphere so as to form a substantially unbroken film of liquid acid flowing over substantially the entire inner wall of said reaction zone, regulating the temperature of said acid entering and the quantity of said acid passed through said zone so as to maintain a maximum gas temperature in the range 80–120° C. and so as to maintain aqueous liquid hydrochloric acid discharged from said zone at a temperature not substantially higher than 75° C. and in the liquid phase, whereby for given operation conditions said acid absorbs substantially no HCl gas formed by said reaction and no great amount of HCl–H₂O vapor mixture is boiled out of said liquid acid into the gaseous atmosphere in said zone.

7. The process for preparing 1,1,1-difluorochloroethane which comprises subjecting, in a reaction zone having a gaseous atmosphere, a mixture of ethylidene fluoride and 0.5–1.5 mol proportions of chlorine to actinic radiation to form 1,1,1-difluorochloroethane and gaseous HCl, continuously recirculating through said zone aqueous liquid hydrochloric acid having an HCl concentration not less than 20%, cooling said recirculated acid externally of said zone, dispersing said recirculated acid in said gaseous atmosphere so as to form a substantially unbroken film of liquid acid flowing over substantially the entire inner wall of said reaction zone, regulating the temperature of said acid entering and the quantity of said acid passed through said zone so as to maintain therein a maximum gas temperature in the range of 95–105° C. and so as to maintain aqueous liquid hydrochloric acid discharged from said zone at a temperature substantially below the maximum gas temperature in said zone and in the liquid phase, whereby for given operating conditions said acid absorbs substantially no HCl gas formed by said reaction and no great amount of HCl-H₂O vapor mixture is boiled out of said liquid acid into the gaseous atmosphere in said zone.

8. The process for preparing 1,1,1-difluorochloroethane which comprises subjecting, in a reaction zone having a gaseous atmosphere, a mixture of ethylidene fluoride and 0.5–1.5 mol proportions of chlorine to actinic radiation to form 1,1,1-difluorochloroethane and gaseous HCl, continuously recirculating through said zone aqueous liquid hydrochloric acid having an HCl concentration not less than 20%, cooling said recirculated acid externally of said zone, dispersing said recirculated acid in said gaseous atmosphere so as to form a substantially unbroken film of liquid acid flowing over substantially the entire inner wall of said reaction zone, regulating the temperature of said acid entering and the quantity of said acid passed through said zone so as to maintain therein a maximum gas temperature in the range of 95–105° C. and so as to maintain aqueous liquid hydrochloric acid discharged from said zone at a temperature in the range of 50–75° C., whereby for given operating conditions said acid absorbs substantially no HCl gas formed by said reaction and no great amount of HCl–H₂O vapor mixture is boiled out of said liquid acid into the gaseous atmosphere in said zone, and recovering 1,1,1-difluorochloroethane from the gas mixture discharged from said zone.

JOHN D. CALFEE.
PATRICK A. FLORIO.

REFERENCES CITED

The following references are of record in the file of this patent:

UNITED STATES PATENTS

| Number | Name | Date |
| --- | --- | --- |
| 2,393,509 | Archibald et al. | Jan. 22, 1946 |

OTHER REFERENCES

Hass et al.: "Chlorination of Paraffins," Industrial and Engineering Chemistry, vol. 28 (1936), p. 337.

Henne et al.: "Directed Chlorination of Aliphatic Fluorides," Journal American Chemical Society, vol. 67 (1945), pp. 1906–8.